(12) United States Patent
Wang et al.

(10) Patent No.: US 6,294,626 B1
(45) Date of Patent: Sep. 25, 2001

(54) OLEFIN POLYMERIZATION CATALYSTS CONTAINING MODIFIED BORAARYL LIGANDS

(75) Inventors: Shaotian Wang, Mason; Jean A. Merrick-Mack, West Chester, both of OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/439,462

(22) Filed: Nov. 15, 1999

(51) Int. Cl.[7] .................................................. C08F 4/52
(52) U.S. Cl. ..................... 526/196; 526/127; 526/132; 526/136; 526/158; 526/160; 526/348; 526/352; 526/943; 502/104; 502/117; 502/152; 502/158; 502/202
(58) Field of Search .................................... 502/104, 117, 502/152, 158, 202; 526/127, 132, 136, 158, 160, 196 B, 348, 352, 943

(56) References Cited

U.S. PATENT DOCUMENTS

| | | | |
|---|---|---|---|
| 4,338,424 | 7/1982 | Morita et al. | 526/65 |
| 4,414,369 | 11/1983 | Kuroda et al. | 526/65 |
| 4,420,592 | 12/1983 | Kato et al. | 526/65 |
| 4,461,873 | 7/1984 | Bailey et al. | 525/240 |
| 4,508,843 | 4/1985 | Etherton et al. | 502/115 |
| 4,530,913 | 7/1985 | Pullukat et al. | 502/104 |
| 4,530,914 | 7/1985 | Ewen et al. | 502/113 |
| 4,565,795 | 1/1986 | Short et al. | 502/110 |
| 4,703,094 | 10/1987 | Raufast | 526/65 |
| 4,937,299 | 6/1990 | Ewen et al. | 526/119 |
| 5,032,562 | 7/1991 | Lo et al. | 502/111 |
| 5,539,076 | 7/1996 | Nowlin et al. | 526/348.1 |
| 5,539,124 | 7/1996 | Etherton et al. | 548/402 |
| 5,554,775 | 9/1996 | Krishnamurti et al. | 556/7 |
| 5,637,660 | 6/1997 | Nagy et al. | 526/160 |
| 5,902,866 | 5/1999 | Nagy et al. | 526/133 |

FOREIGN PATENT DOCUMENTS

WO 97/23512    7/1997   (WO).

OTHER PUBLICATIONS

Gerhard E. Herberich, Bernd Schmidt, and Ulli Englert, "Borabenzene Derivatives. 22.[1] Synthesis of Boratabenzene Salts from 2,4–Pentadienylboranes. Structure of [NMe$_3$Ph] [C$_5$H$_5$BMe]", 1995 *American Chemical Society*, Organometallics, 1995, 14, 471–480.

Deloux et al., Chem. Rev., 93, pp. 763–784, 1993.

Narasaka, Synthesis, pp. 1–11, 1991.

*Primary Examiner*—David W. Wu
*Assistant Examiner*—Ling-Siu Choi
(74) *Attorney, Agent, or Firm*—Kevin M. Carroll

(57) ABSTRACT

A single-site olefin polymerization catalyst is described. The catalyst comprises an activator and an organometallic compound that includes a Group 3 to 10 transition or lanthanide metal, M, and a modified boraaryl ligand. We surprisingly found that the catalyst is more active in olefin polymerization compared to other catalysts containing non-modified boraaryl ligands. Most surprisingly, the supported catalyst gives polyolefins with a multimodal molecular weight distribution having separate components of distinct molecular weight.

20 Claims, 6 Drawing Sheets

OLEFIN POLYMERIZATION CATALYSTS CONTAINING MODIFIED BORAARYL LIGANDS

FIELD OF THE INVENTION

This invention relates to a catalyst for polymerizing olefins. The catalyst comprises an activator and an organometallic compound that incorporates a modified boraaryl ligand. The catalyst when supported is surprisingly useful for the preparation of multimodal polyolefins having separate components of distinct molecular weight.

BACKGROUND OF THE INVENTION

Interest in metallocene and non-metallocene single-site catalysts has continued to grow rapidly in the polyolefin industry. These catalysts are more active than conventional Ziegler-Natta catalysts, and they produce polymers with improved physical properties. The improved properties include narrow molecular weight distribution, reduced low molecular weight extractables, enhanced incorporation of α-olefin comonomers, and lower polymer density. Examples of non-metallocene single-site catalysts include catalysts containing a boraaryl moiety such as borabenzene, boranaphthalene or boraphenanthrene. See U.S. Pat. No. 5,554,775 and PCT Int. Appl. WO 97/23512.

Unfortunately, the uniformity of molecular weight distribution (MWD) reduces the thermal processing ability of polyolefins made with single-site catalysts. These polyolefins also have a higher tendency to melt fracture, especially at higher molecular weights. These disadvantages combine to make it difficult to process polyolefins produced by single-site catalysts under conditions normally used for Ziegler-Natta polymers. Controllable broadening of MWD is therefore a desired advance in single-site catalyst technology.

One method of increasing processability and broadening MWD of polyolefins produced by single-site catalysts is to physically mix two or more different polyolefins to produce a blended polyolefin mixture with a multimodal molecular weight distribution. For example, see U.S. Pat. No. 4,461, 873. In addition, olefin polymerization has been performed in a dual reactor system in order to broaden MWD. The olefin is polymerized by a catalyst in one reactor under one set of conditions, and then the polymer is transferred to a second reactor under a different set of conditions. The first reactor typically produces a high-molecular-weight component, and the second reactor produces a low-molecular-weight component. See U.S. Pat. Nos. 4,338,424, 4,414,369, 4,420,592, and 4,703,094. Lastly, a one-reactor, two-catalyst process has also been used to make multimodal, broad-MWD polymers. The olefin is polymerized in one reactor by two catalysts with different reactivity to form a reactor blend having broad and/or multimodal molecular weight distribution. The catalysts may be either two (or more) separate metallocenes or a metallocene and a Ziegler-Natta component. See, for example, U.S. Pat. Nos. 4,937, 299 and 4,530,914, in which at least two separate metallocenes are used in one reactor to form multimodal polymers. See U.S. Pat. Nos. 5,032,562 and 5,539,076 for examples of the metallocene/Zeigler-Natta catalyst mixture in one reactor.

A significant disadvantage of each of these methods is the added cost of using two reactors or two catalysts in the polymerization process. A simpler method would use a single catalyst system that produces multimodal, broad MWD, polymers in a one-reactor process. A catalyst that can produce multimodal polyolefins having separate components of distinct molecular weight would be especially valuable since these polymers are useful in blow-molding and film resin technologies.

In sum, new catalysts are needed. Particularly valuable catalysts are those that could be used in a one-reactor process to produce multimodal polyolefins having separate components of distinct molecular weight.

SUMMARY OF THE INVENTION

The invention is a catalyst for polymerizing olefins. The catalyst comprises: (a) an activator; and (b) an organometallic compound comprising a Group 3 to 10 transition or lanthanide metal and a modified boraaryl ligand. The catalyst surprisingly leads to increased activity in olefin polymerization compared catalysts containing non-modified boraaryl ligands. Even more surprisingly, the catalyst when supported is useful in the production of multimodal polyolefins having separate components of distinct molecular weight.

DETAILED DESCRIPTION OF THE INVENTION

Figure 1:
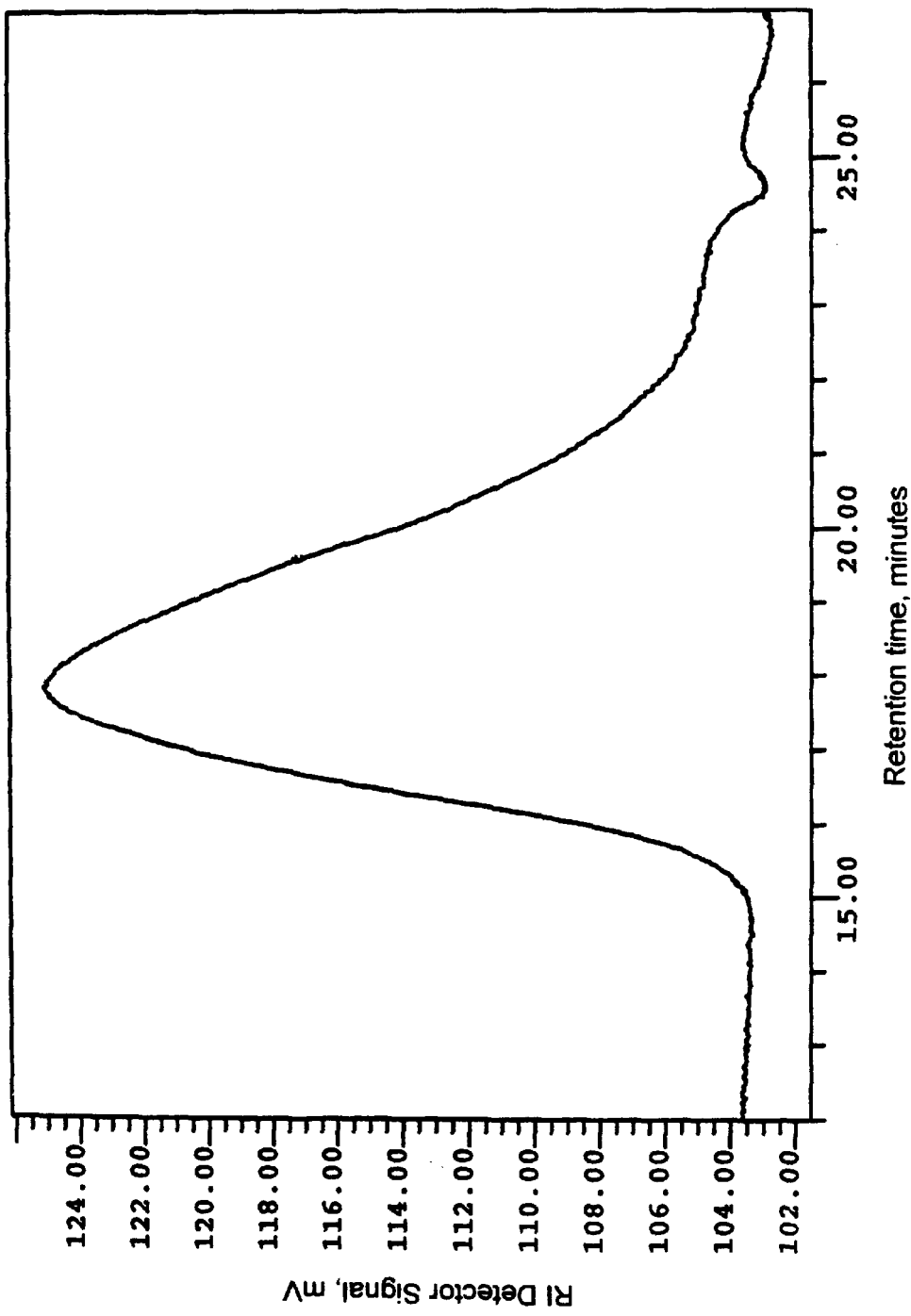
FIG. 1 is the Gel Permeation Chromatography (GPC) trace of the polymer prepared in Example A.

Catalysts of the invention comprise an activator and an organometallic compound comprising a Group 3 to 10 transition or lanthanide metal, M, and a modified boraaryl ligand.

The metal, M, may be any Group 3 to 10 transition or lanthanide metal. Preferably, the catalyst contains a Group 4 to 6 transition metal; more preferably, the catalyst contains a Group 4 metal such as titanium or zirconium.

The modified boraaryl ligand contains a boraaryl ring that is covalently linked to a non-carbon Group 14 substituent. The boraaryl ring may be any substituted or unsubstituted boraaryl ring, such as substituted or unsubstituted borabenzenes, boranaphthalenes or boraphenanthrenes, as illustrated by U.S. Pat. No. 5,554,775. The Group 14 substituent contains a silicon, germanium, tin, or lead atom that is attached directly to the boraaryl ring. The Si, Ge, Sn, or Pb atom of the Group 14 substituent is also attached to one or more ligands. Preferred ligands attached to the Group 14 atom include halide, $C_1$–$C_{20}$ alkoxy, $C_1$–$C_{20}$ hydrocarbyl, or mixtures thereof. Particularly preferred ligands are hydrocarbyl groups as in boraaryl modification with a trimethylsilyl or a trimethylstannyl group. The modified boraaryl ligand can have one or more Group 14 substituents bonded to the boraaryl ring. The Group 14 substituent can be attached to any carbon atom of the boraaryl ring. Preferably, the Group 14 substituent is located on the carbon α to the boron atom of the boraaryl ring.

The transition or lanthanide metal may also have other polymerization-stable anionic ligands. Suitable ligands include cyclopentadienyl (substituted or unsubstituted) anions such as those described in U.S. Pat. Nos. 4,791,180 and 4,752,597, the teachings of which are incorporated herein by reference. Suitable ligands also include another modified or non-modified boraaryl or a substituted or unsubstituted azaborolinyl, pyrrolyl, indolyl, quinolinyl, hydroxypyridinyl, or aminopyridinyl group as described in U.S. Pat. Nos. 5,554,775, 5,539,124, 5,637,660, and 5,902,866, the teachings of which are also incorporated herein by reference.

The modified boraaryl ligand and the other polymerization-stable anionic ligand can be bridged. Groups that can be used to bridge the ligands include, for example, methylene, ethylene, 1,2-phenylene, dialkylsilyls, and diarylsilyls. Normally, only a single bridge is used in the single-site catalyst, but complexes with two bridging groups can be used. Bridging the ligand changes the geometry around the transition metal and can improve catalyst activity and other properties, such as molecular weight, comonomer incorporation, and thermal stability.

Other suitable ligands include halides and $C_1$–$C_{20}$ alkoxy, siloxy, hydrocarbyl, or dialkylamido ligands. If the ligand is a $C_1$–$C_{20}$ hydrocarbyl group, it is preferably a group that lacks a hydrogen atom on a carbon that is beta to M. Thus, preferred hydrocarbyl groups include methyl, benzyl, phenyl, neopentyl, or the like. Particularly preferred ligands are halides.

A preferred catalyst comprises an activator and an organometallic compound of the formula:

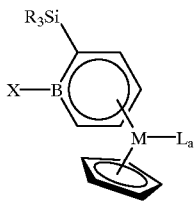

where
M is a Group 4–6 transition metal;
L is hydride, halide, $C_1$–$C_{20}$ alkoxy, siloxy, hydrocarbyl, or dialkylamido, or mixtures thereof;
R is $C_1$–$C_{20}$ hydrocarbyl;
X is hydrogen, $C_1$–$C_{20}$ hydrocarbyl, or $C_1$–$C_{20}$ dialkylamino; and
a=1–4.

The organometallic compound is prepared by any suitable method. In one convenient method, the organometallic compound is made by reacting a modified boracyclohexadiene with one equivalent of a deprotonating base in an inert organic solvent. The inert organic solvent is any organic solvent that is inert to the deprotonating agent. Preferred solvents include diethyl ether, tetrahydrofuran, hexane, and toluene. The deprotonated anionic reaction product, a modified borabenzene anion, is then reacted with a Group 3–10 transition or lanthanide metal complex in an inert organic solvent to form the organometallic compound. Preferred Group 3–10 transition or lanthanide metal complexes contain at least one halide. Stoichiometric quantities are typically used. The reactions can occur at room temperature, but a lower temperature of −100° C. to 0° C. is preferred. By-products are removed by filtration, the solvent is evaporated, and the organometallic compound is collected.

The organometallic compound is combined with an activator to give a catalyst of the invention. Suitable activators include alumoxanes.

Preferred alumoxanes are polymeric aluminum compounds represented by the cyclic formula $R^1$—Al—O$)_s$, or the linear formula $R^1(R^1$—Al—O$)_s$Al$R^1$ wherein $R^1$ is a $C_1$–$C_5$ alkyl group and s is an integer from 1 to about 20. Preferably, $R^1$ is methyl and s is from about 4 to about 10. Exemplary alumoxane activators are (poly) methylalumoxane (MAO), ethylalumoxane, and diisobutylalumoxane. Optionally, the activator is a trialkyl or triaryl aluminum compound, which preferably has the formula Al$R^2_3$ where $R^2$ denotes a $C_1$–$C_{20}$ hydrocarbyl group.

Suitable activators also include neutral boron and aluminum compounds, including substituted or unsubstituted trialkyl or triaryl boron or aluminum derivatives, such as tris(pentafluorophenyl)boron and tris(pentafluorophenyl) aluminum. Suitable activators also include ionic borates and aluminates such as tri(n-butyl)ammonium tetrakis (pentafluorophenyl)borate, trityl tetrakis(pentafluorophenyl) borate or trityl tetrakis(pentafluorophenyl)aluminate. The ionic borates and aluminates ionize the neutral organometallic compound to produce an active catalyst for olefin polymerization. See, for instance, U.S. Pat. Nos. 5,153,157, 5,198,401, and 5,241,025, all of which are incorporated herein by reference.

The organometallic compound and the activator are preferably injected into a reactor containing an olefin monomer. The organometallic compound and the activator can be premixed before injecting into the reactor. Alternatively, the organometallic compound and the activator can be injected separately. If the organometallic compound and the activator are injected separately into the reactor, the activator is preferably injected first. The molar ratio of activator to organometallic compound is preferably from about 0.3:1 to about 15,000:1, more preferably from about 20:1 to 800:1, and most preferably from about 50:1 to 500:1. Where the activator is an ionic borate, the molar ratio of the boron of the activator component to the transition metal of the single-site catalyst is preferably in the range of about 0.3:1 to 3:1.

The organometallic compound and the activator may be immobilized on a support, which is preferably a porous material. A support may be required for some processes. For example, a support is generally needed in gas phase and slurry polymerization processes to control polymer particle size and to prevent fouling of the reactor walls. The catalysts may be supported using any of a variety of well-known immobilization techniques. In one method, the organometallic compound is dissolved in a solvent and is deposited onto the support by evaporating the solvent. An incipient wetness method can also be used. The activator can also be deposited on the support or it can be introduced into the reactor separately from the supported organometallic compound. The support can be inorganic oxides, inorganic chlorides, and polymeric resins such as polystryrene, styrene-divinylbenzene copolymers, or the like, or mixtures thereof. Preferred supports are inorganic oxides, which include oxides of Group 2, 3, 4, 5, 13, or 14 elements. More preferred supports include silica, alumina, silica-alumina, magnesia, titania, and zirconia.

The support can be used without any pre-treatment prior to immobilization of the organometallic compound and activator, but a support pre-treatment step is preferred. The support may be calcined and/or modified by a chemical additive. If the support is pre-treated by calcination, the calcination temperature is preferably greater than 150° C.

The chemical additives used to pre-treat the support include organoaluminums, organoboranes, organomagnesiums, organosilanes, and organozinc compounds. Preferred chemical additives include alumoxanes, hexamethyldisilazane, trimethylchlorosilane, Grignard reagents, and triethylboron. Support modification techniques are taught in U.S. Pat. Nos. 4,508,843, 4,530,913, and 4,565,795, the teachings of which are incorporated herein by reference.

The process of the invention is used to polymerize olefins, preferably α-olefins. Suitable olefins include, for example, ethylene, propylene, 1-butene, 1-hexene, 1-octene, and the like, and mixtures thereof. The catalyst is valuable for copolymerizing ethylene with α-olefins or di-olefins (e.g., 1,3-butadiene, 1,4-hexadiene, 1,5-hexadiene).

Processes of the invention include gas phase, slurry, and bulk monomer processes. Gas and slurry phase processes are preferred. They can be used in a liquid phase (slurry, solution, suspension, bulk), high-pressure fluid phase, or gas phase polymerization processes, or a combination of these. The pressure in the polymerization reaction zones typically ranges from about 15 psia to about 15,000 psia, and the temperature usually ranges from about −100° C. to about 300° C.

A slurry process involves pressures in the range of about 1 to about 500 atmospheres and temperatures in the range of about −60° C. to about 100° C. The reaction medium employed should be liquid under the conditions of polymerization and relatively inert. Preferably, it is an alkane, a cycloalkane, or an aromatic hydrocarbon such as toluene, ethylbenzene, or xylene. More preferably, hexane or isobutane is employed.

The invention includes a method for making multimodal, broad-MWD polymers having separate components of distinct molecular weight. This method comprises reacting ethylene or a mixture of ethylene and a $C_3$–$C_{10}$ α-olefin in the presence of a supported catalyst comprising an organometallic compound of the invention, an alumoxane activator, and a support. This method can be performed in gas phase, slurry, and bulk monomer processes. Gas and slurry phase processes are preferred. The pressure in the polymerization reaction zones typically ranges from about 15 psia to about 15,000 psia, and the temperature usually ranges from about −100° C. to about 300° C.

The following examples merely illustrate the invention. Those skilled in the art will recognize many variations that are within the spirit of the invention and scope of the claims.

EXAMPLE 1

This example describes the synthesis of (2-trimethylsilyl-1-methylborabenzene) cyclopentadienyl zirconium dichloride, which has the structural formula:

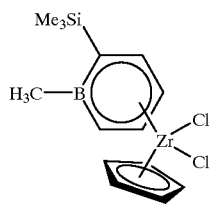

Methylborabenzene lithium salt ($CH_3$—$BC_5H_5^-Li^+$) is prepared according to the procedure of Herberich, et. al., *Organometallics*, 1995, 14, 471. Trimethylchlorosilane (2.64 g, 24.3 mmoles) is added to a solution of $CH_3$—$BC_5H_5^-Li^+$ (1.20 g, 12.3 mmol) in 3.0 mL THF at room temperature, the mixture is stirred for 40 minutes, and the volatiles are removed by vacuum distillation. The residue is dissolved in hexane and the lithium chloride precipitate is separated by filtration. $CH_3$—$BC_5H_5SiMe_3$ (1.02 g, 51% yield) is collected as a colorless liquid by vacuum condensation (58–60° C./5–6 mm Hg).

N-butyl lithium solution (8.13 mL of 1.6 M n-BuLi in hexane) is added to a solution of diisopropylamine (1.32 g) in 6.0 mL THF at 0° C., and the mixture is stirred for 1.5 hours before cooling to −60° C. $CH_3$—$BC_5H_5SiMe_3$ (0.99 g, 12.0 mmol) in 1.0 mL THF is then added to the mixture at −60° C. The mixture is allowed to warm to room temperature and is stirred for an additional hour. The volatiles are removed by vacuum distillation and 20 mL hexane is added to the red-brown residue. The $CH_3$—$BC_5H_4SiMe_3^-Li^+$ product (0.73 g, 4.29 mmole) is collected by filtration and an additional hexane wash (36% yield).

$CH_3$—$BC_5H_4SiMe_3^{-Li+\ salt}$ (0.34 g, 2.0 mmol) in 8.0 mL diethylether is added to cyclopentadienyl zirconium trichloride tetrahydrofuran complex ($CpZrCl_3.2THF$, 0.814 g, 2.0 mmol) in 25 mL diethyl ether at −78° C. The mixture is warmed to room temperature and stirred for 1.5 hours, then volatiles are removed by vacuum distillation and toluene is added to the residue. Lithium chloride is separated by filtration and) pure complex is obtained by crystallization (0.445 g, 1.14 mmol, 57% yield).

NMR Results: $^1H$ NMR ($C_6D_6$)($CH_3$)$_3$Si, 0.24, s; B—$CH_3$, 1.09, s; Cp—H, 5.97, s; borabenzene—H 5.62, d; 6.24, dd; 6.95 dd; 7.87 d. $^{13}C$ NMR ($C_6D_6$)($CH_3$)$_3$Si, −0.1; Cp, 111.6; borabenzene-C 109.9, 143.8, 154.7. $^{11}B$ NMR ($C_6D_6$) 47.3 ($BF_3.Et_2O$ as reference).

COMPARATIVE EXAMPLE 2

This example describes the synthesis of (cyclopentadienyl)(1-methylboratabenzene) zirconium dichloride, which has the structural formula:

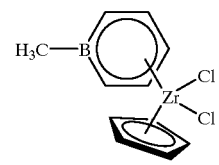

Methylborabenzene lithium salt ($CH_3$—$BC_5H_5^-Li^+$) is prepared according to the procedure of Herberich, et. al., *Organometallics*, 1995, 14, 471. $CH_3$—$_{BC_5}H_5^-Li^+$ salt (0.34 g, 2.0 mmol) in 8.0 mL diethylether is added to cyclopentadienyl zirconium trichloride tetrahydrofuran complex ($CpZrCl_3.2THF$, 0.814 g, 2.0 mmol) in 25 mL diethyl ether at −78° C. The mixture is warmed to room temperature and stirred for 1.5 hours. Volatiles are removed by vacuum distillation and toluene is added to the residue. Lithium chloride is separated by filtration and 0.445 g (1.14 mmole) pure complex is obtained by crystallization (57% yield).

NMR Results: $^1H$ NMR ($C_6D_6$) B—$CH_3$, 0.916, s; Cp—H, 5.96, s;

borabenzene—H 5.79, d; 6.28, t; 7.34 dd. $^{13}$C NMR ($C_6D_6$) Cp, 117.8; borabenzene-C 110.0, 147.9. $^{11}$B NMR ($C_6D_6$) 43.7 ($BF_3.Et_2O$ as reference).

EXAMPLE 3

This example describes the preparation of a supported catalyst of (2-trimethylsilyl-1-methylborabenzene) cyclopentadienyl zirconium dichloride [(2-Me$_3$Si—MeBBz)CpZrCl$_2$] of Example 1 on silica:

Polymethalumoxane in toluene (19 g of 4.2 M PMAO-lP, 12.9 wt. % Al, Akzo-Nobel) is added to silica (5.0 g, Davison 948, previously calcined at 275° C.) in 30 mL toluene at room temperature and is stirred overnight. The suspension is filtered and the solid washed with toluene (3×20 mL) and hexane (3×20 mL). The PMAO-treated silica is then dried under vacuum (10.16 g isolated). (2-Me$_3$Si—MeBBz)CpZrCl$_2$ from Example 1 (30 mg) in 7 mL hexane is added to the PMAO-treated silica support (1.02 g) at room temperature. The mixture is stirred for 15 minutes, filtered and the solid is then dried under vacuum for two hours at room temperature.

COMPARATIVE EXAMPLE 4

This example describes the preparation of a supported catalyst of (1-methylborabenzene) cyclopentadienyl zirconium dichloride [(MeBBz)CpZrCl$_2$] of Example 2 on silica:

Polymethalumoxane in toluene (19 g of 4.2 M PMAO-lP, 12.9 wt. % Al) is added to silica (5.0 g, Davison 948, previously calcined at 275° C.) in 30 mL toluene at room temperature and is stirred overnight. The suspension is filtered and the solid washed with toluene (3×20 mL) and hexane (3×20 mL). The PMAO-treated silica is then dried under vacuum (10.16 g isolated). (MeBBz)CpZrCl2 from Example 2 (20 mg) in 6 mL toluene is added to the PMAO-treated silica support (1.0 g) at room temperature. The mixture is stirred for 15 minutes, and toluene is removed by vacuum. The solid is then dried under vacuum for four hours.

EXAMPLE 5

This example describes the formation of a supported catalyst of (2-trimethylsily-1-methylborabenzene) cyclopentadienyl zirconium dichloride of Example 1 on silica that is not calcined prior to supporting:

Polymethalumoxane in toluene (15.3 g of 4.2 M PMAO-lP, 12.9 wt. % Al) is added to silica (2.5 g, PQ MS3050, not calcined) in 20 mL toluene at room temperature and stirred overnight. The toluene is removed under vacuum and the solid is washed with hexane (2×30 mL). The PMAO-treated silica is then dried under vacuum (7.2 g isolated). (2-Me$_3$Si—MeBBz)CpZrCl$_2$ from Example 1 (40 mg) in 10 mL hexane is added to the PMAO-treated silica support (1.28 g) at room temperature. The mixture is stirred for 15 minutes, filtered and the solid is then washed with hexane and dried under vacuum for two hours at room temperature.

EXAMPLES A–F

Slurry polymerization is conducted in a stirred 1.7-liter, stainless-steel reactor. Reactions are run at 80° C. and 150 psi. Dry, oxygen-free hexane (750 mL) is charged to the dry, oxygen-free reactor at room temperature along with any comonomer, if required, and 5.5 mL of 0.1 M PMAO toluene solution. If required, hydrogen (10 dpsi, 30 mmole) is then added to the reactor. The specified amount of catalyst (dissolved or suspended in toluene) is injected into the reactor. The reactor is heated to 80° C. and allowed to equilibrate. Ethylene is then introduced to give a total pressure of 150 psig, and the reactor is allowed to equilibrate again. Ethylene is fed to the reactor to maintain a constant pressure. At the end of one hour (0.5 hours for run A), ethylene flow is stopped and the reaction mixture is cooled to room temperature. The polymer is collected by filtration, dried overnight in a vacuum oven, and weighed. The polymer product is analyzed by gel permeation chromatography (GPC).

Figure 2:
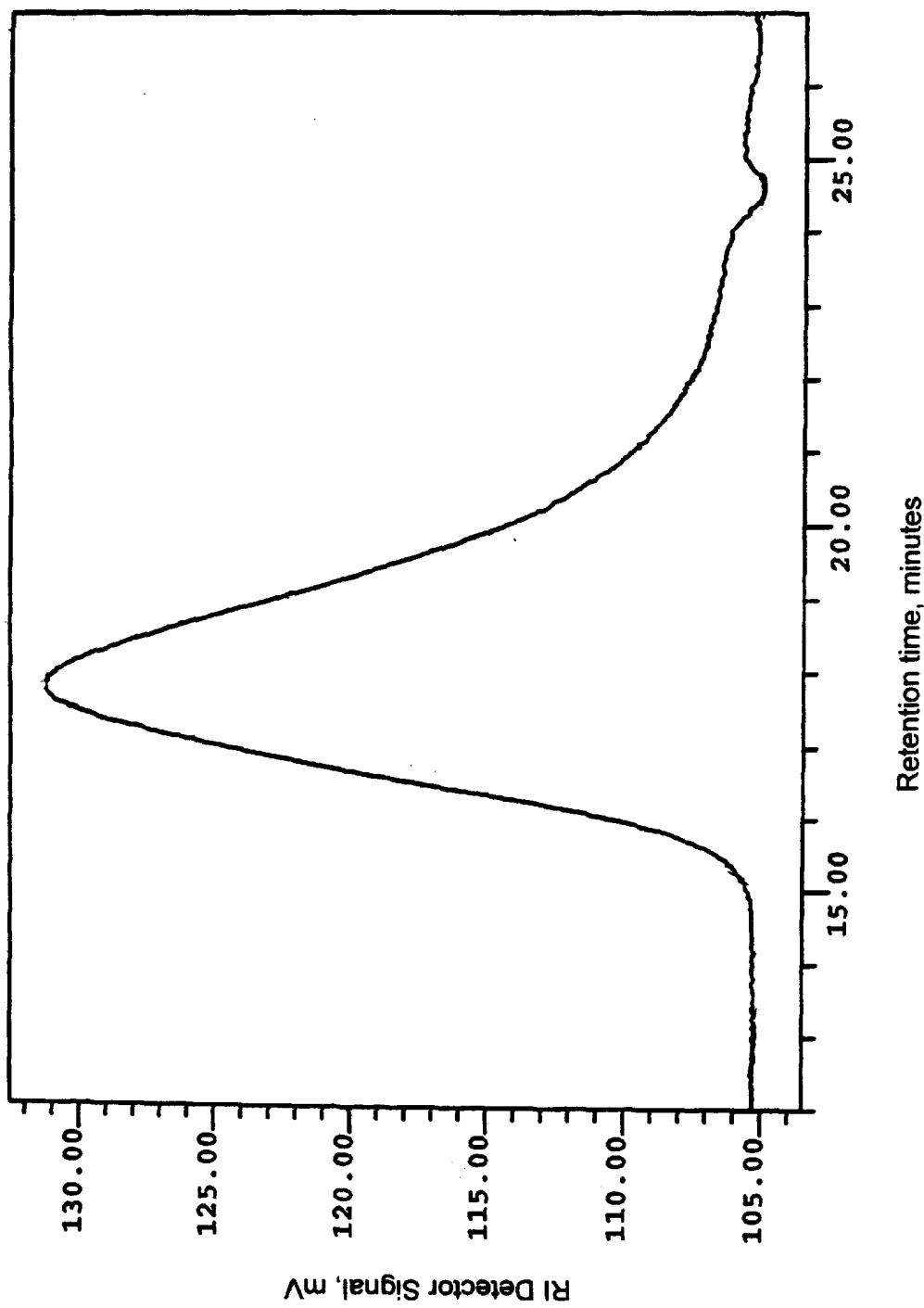
FIG. 2 is the GPC trace of the polymer prepared in Example B.
Figure 3:
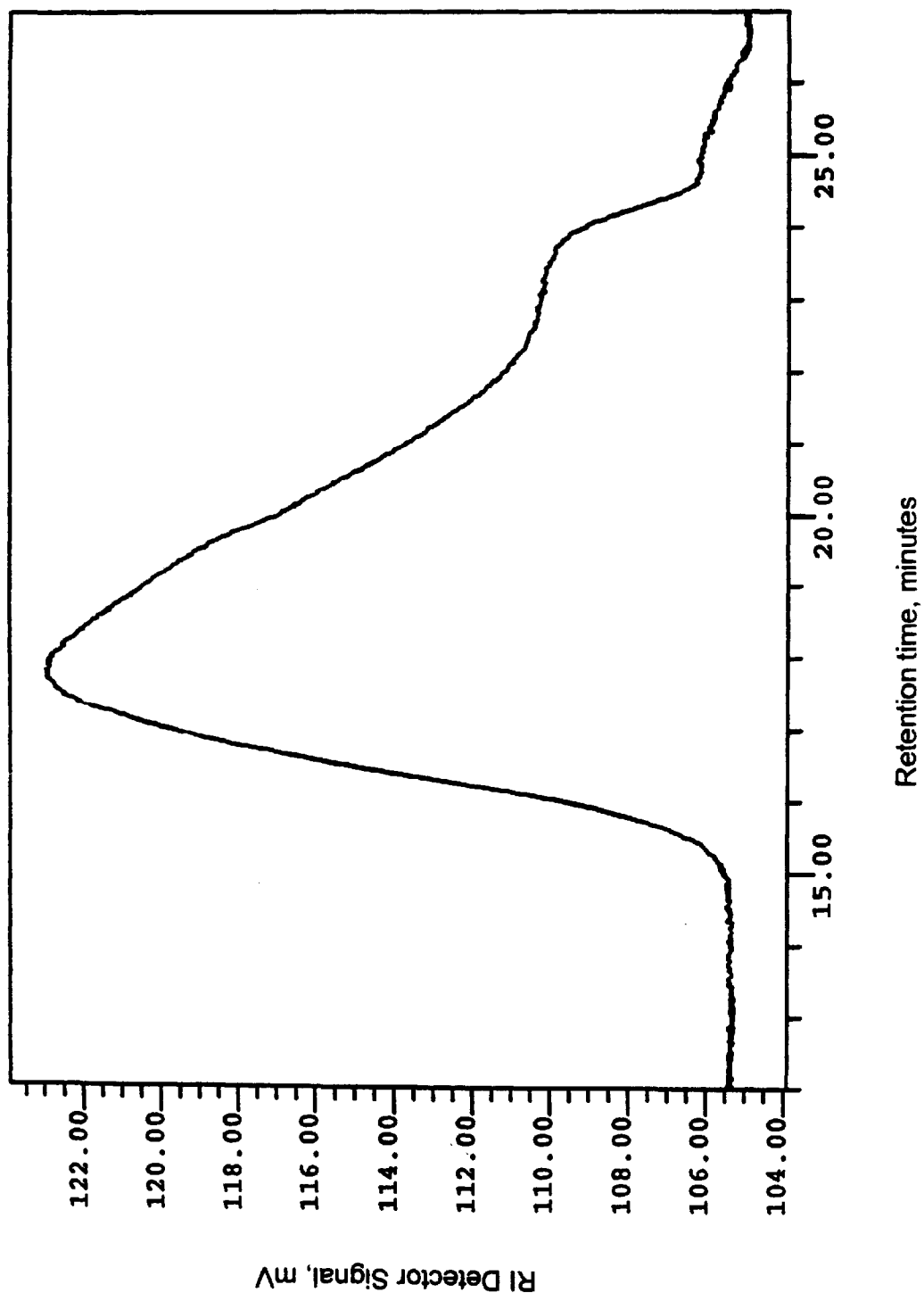
FIG. 3 is the GPC trace of the polymer prepared in Example C.
Figure 4:
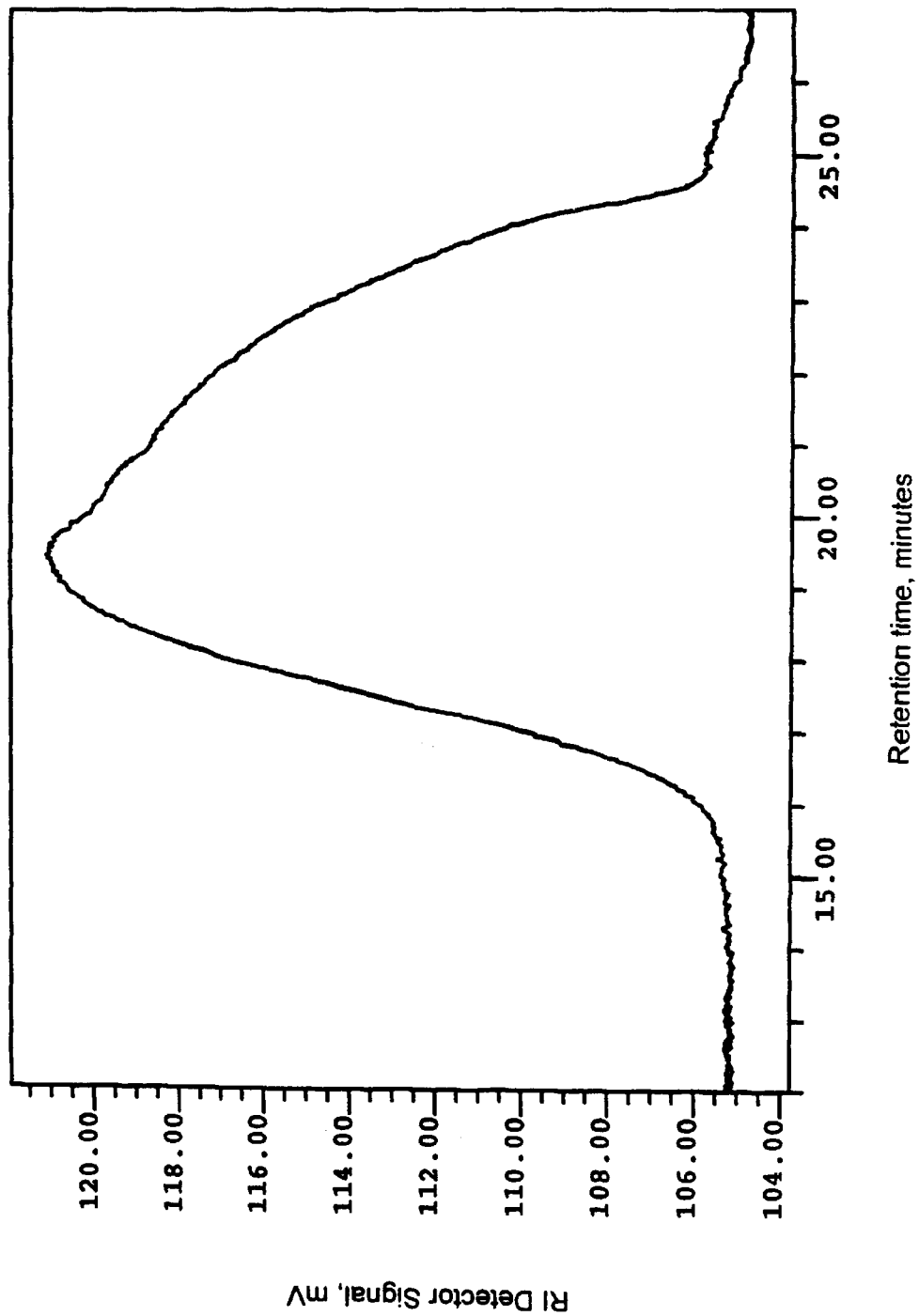
FIG. 4 is the GPC trace of the polymer prepared in Example D.
Figure 5:
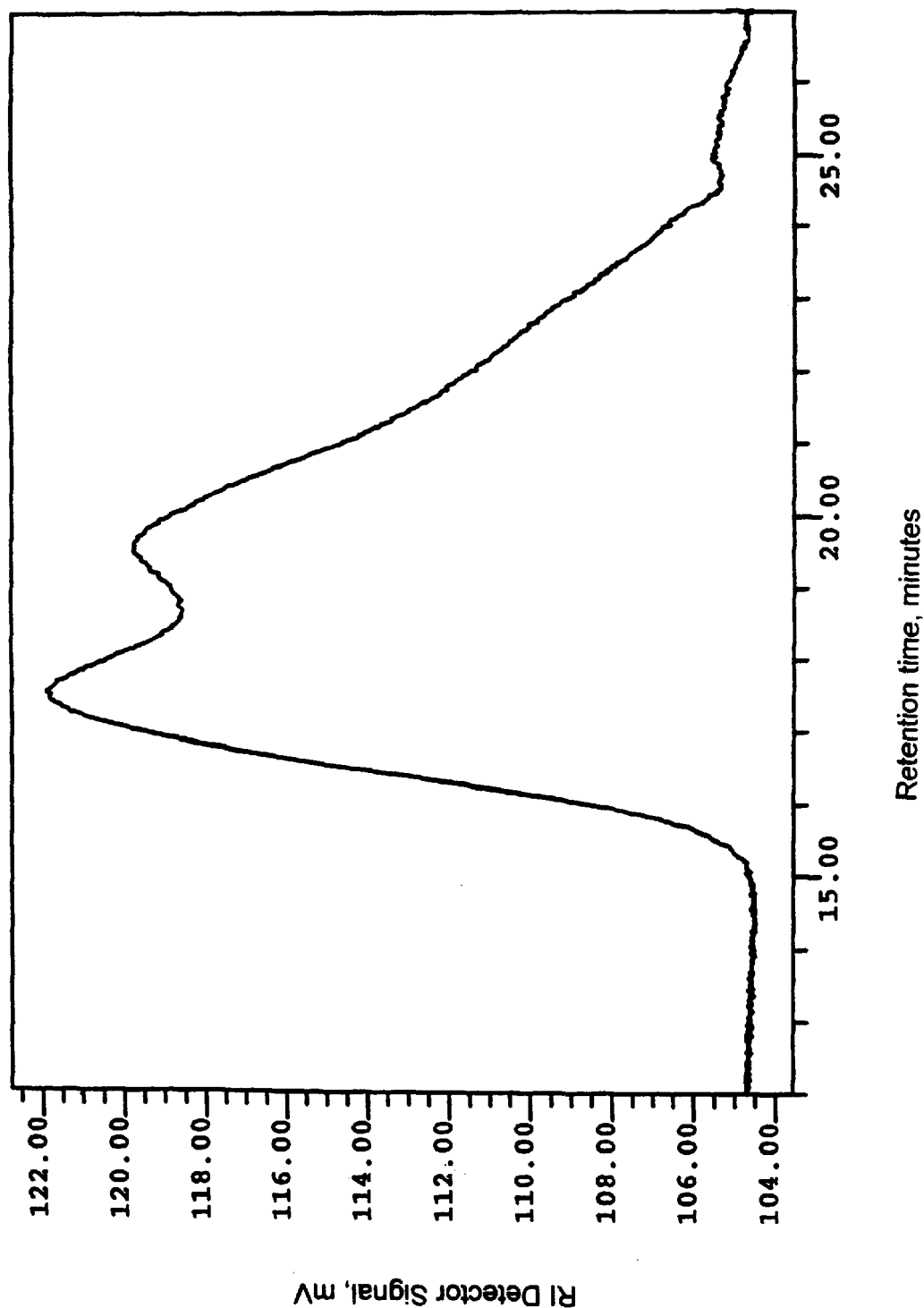
FIG. 5 is the GPC trace of the polymer prepared in Example E.
Figure 6:
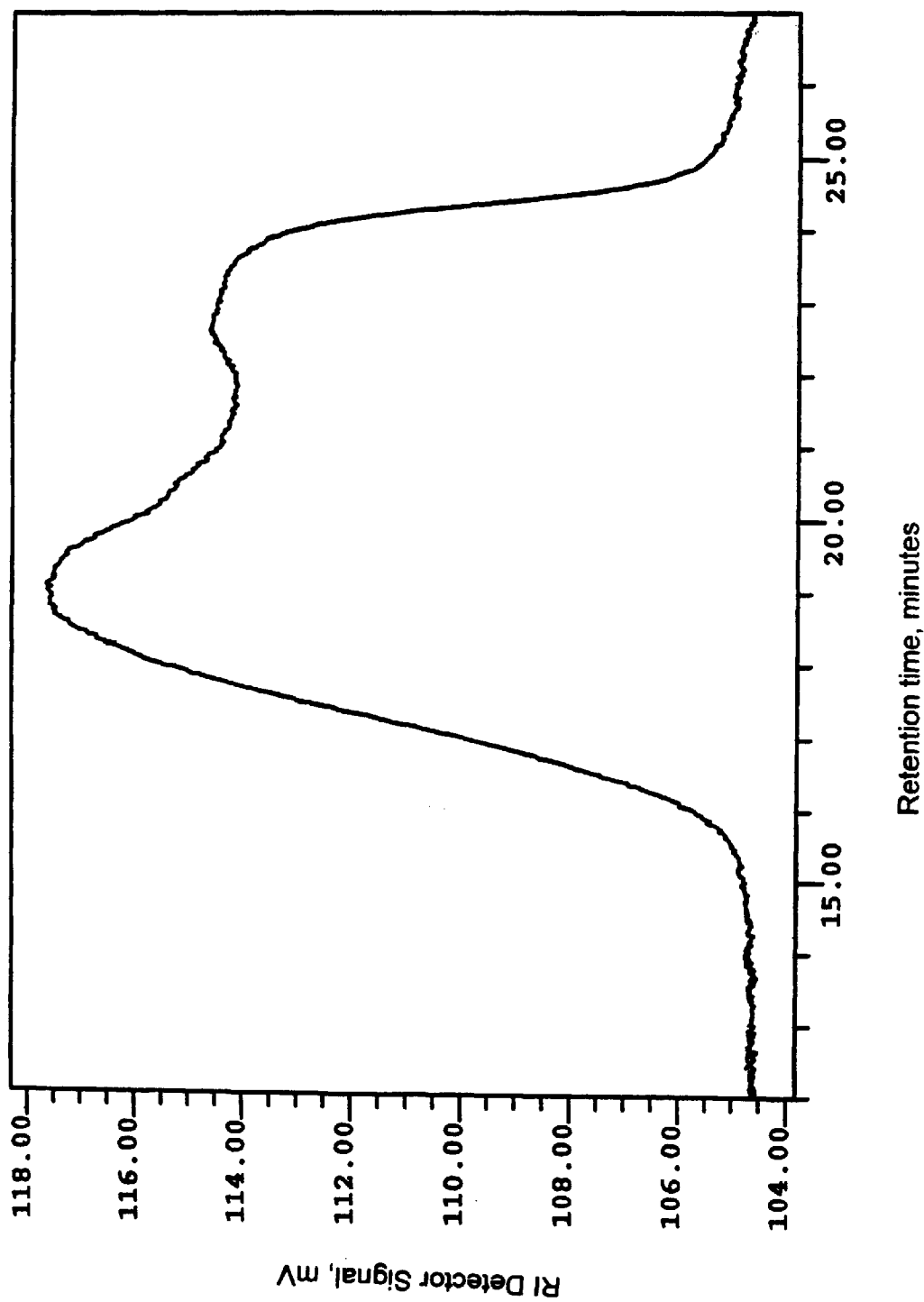
FIG. 6 is the GPC trace of the polymer prepared in Example F.

Six runs (Runs A to F) are conducted using the catalysts of Examples 1 to 5. Table 1 contains the reaction conditions for each of the polymerization runs. Table 2 shows an activity comparison between unsupported and supported catalysts with and without a Group 14 substituent. Table 3 shows GPC results for the polyolefins made with supported, modified boraaryl-containing catalysts. FIGS. 1–6 correspond to the GPC traces of the polymers of Examples A–F, respectively.

The examples show that modified boraaryl catalysts are more active and produce polyolefins with broader molecular weight distributions compared to non-modified boraaryl catalysts (see Table 2). Also, the supported, modified boraaryl catalyst gives polymers having a multimodal MWD with separate components of distinct molecular weight (see Table 3 and FIGS. 3, 5, and 6). In comparison, unsupported boraaryl catalysts give polymers with essentially unimodal MWD (see FIGS. 1 and 2). A supported, non-modified catalyst gives a polymer with a broad MWD that shows indistinct broadening of the main peak in the GPC trace (see FIG. 4).

TABLE 1

Polymerization Run Conditions

| Run # | Catalyst # | Catalyst amount (mg) | Al/Zr ratio | Comonomer | H$_2$ (mmol) | Reaction time (h) |
|---|---|---|---|---|---|---|
| A | 1 | 1.8 | 122 | — | — | 0.5 |
| B* | 2 | 1.5 | 122 | — | — | 1 |
| C | 3 | 63 | 180 | — | 30 | 1 |
| D* | 4 | 73 | 180 | — | 30 | 1 |
| E | 3 | 63 | 180 | Butene, 20 mL | — | 1 |
| F | 5 | 60 | 220 | — | 30 | 1 |

*Comparative Example

TABLE 2

Activity Difference between Modified Borabenzene Catalyst and Non-Modified Borabenzene Catalyst

| Run # | Catalyst Type | Al/Zr ratio | MWD | Activity (kg polymer/g Zr/h) |
|---|---|---|---|---|
| A | Unsupported (2-Me$_3$Si-2-MeBBz)CpZrCl$_2$ | 122 | 8.8 | 334 |
| B* | Unsupported | 122 | 7.8 | 181 |

TABLE 2-continued

Activity Difference between Modified Borabenzene Catalyst and Non-Modified Borabenzene Catalyst

| Run # | Catalyst Type | Al/Zr ratio | MWD | Activity (kg polymer/g Zr/h) |
|---|---|---|---|---|
| C | (MeBBz)CpZrCl$_2$ Supported | 180 | 15.9 | 200 |
| D* | (2-Me$_3$Si-1-MeBBz)CpZrCl$_2$ Supported (MeBBZ)CpZrCl$_2$ | 180 | 9.9 | 132 |

*Comparative Example

TABLE 3

Polymerization GPC Results Showing Multimodal MWD of Resulting Polymer

| Run # | Silica Calcination Temp. (° C.) | Co-monomer | Activity (kg polymer/g Zr/h) | MWD | Peak #1 MW (% area) | Peak #2 MW (% Area) |
|---|---|---|---|---|---|---|
| E | 275 | Butene | 186 | 12.9 | 70,000 (65) | 1600 (35) |
| F | — | — | 71 | 13.7 | 200,000 (55) | 22,000 (45) |

We claim:

1. A catalyst which comprises:

(a) an activator; and (b) an organometallic compound comprising a Group 3 to 10 transition or lanthanide metal, M, and a modified boraaryl ligand that is π-bonded to M, wherein the modified boraaryl ligand is a boraaryl ligand that is covalently linked through carbon to a silicon, germanium, tin, or lead atom.

2. The catalyst of claim 1 wherein M is a Group 4–6 transition metal.

3. The catalyst of claim 1 wherein M is a Group 4 transition metal.

4. The catalyst of claim 1 wherein the activator is selected from the group consisting of alumoxanes, neutral aluminum compounds, neutral boron compounds, ionic borates, and ionic aluminates.

5. The catalyst of claim 1 wherein the boraaryl ligand is covalently linked through carbon to a silicon atom.

6. A supported catalyst of claim 1.

7. The catalyst of claim 6 wherein the support is calcined at a temperature greater than 150° C. prior to addition of the organometallic compound.

8. A catalyst which comprises:

(a) an activator; and (b) an organometallic compound of the formula:

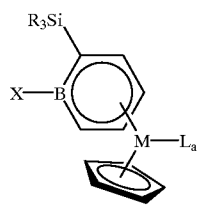

where

M is a Group 4–6 transition metal;

L is hydride, halide, $C_1$–$C_{20}$ alkoxy, siloxy, hydrocarbyl, dialkylamido, or mixtures thereof;

R is $C_1$–$C_{20}$ hydrocarbyl;

X is hydrogen, $C_1$–$C_{20}$ hydrocarbyl, $C_1$–$C_{20}$ aralkyl, or $C_1$–$C_{20}$ dialkylamino; and a=1–4.

9. The catalyst of claim 8 wherein M is a Group 4 transition metal.

10. The catalyst of claim 8 wherein the activator is selected from the group consisting of alumoxanes, neutral aluminum compounds, neutral boron compounds, ionic borates, and ionic aluminates.

11. The catalyst of claim 8 wherein R is methyl.

12. A supported catalyst of claim 8.

13. A method which comprises polymerizing an olefin in the presence of the catalyst of claim 1.

14. The method of claim 13 wherein the olefin is ethylene or a mixture of ethylene and a $C_3$–$C_{10}$ α-olefin.

15. A method which comprises polymerizing an olefin in the presence of the catalyst of claim 8.

16. The method of claim 15 wherein the olefin is ethylene or a mixture of ethylene and a $C_3$–$C_{10}$ α-olefin.

17. A method for producing polyolefins comprising reacting an olefin in the presence of a catalyst which comprises a support, an alumoxane activator, and an organometallic compound comprising a Group 3 to 10 transition or lanthanide metal, M, and a modified boraaryl ligand that is covalently linked through carbon to a silicon, germanium, tin, or lead atom, wherein the polyolefin produced has a multimodal molecular weight distribution with separate components of distinct molecular weight.

18. The method of claim 17 wherein the olefin is ethylene or a mixture of ethylene and a $C_3$–$C_{10}$ α-olefin.

19. The method of claim 17 wherein the support is calcined at a temperature greater than 150° C. prior to addition of the organometallic compound.

20. The method of claim 17 wherein the support is pre-treated with a chemical additive prior to addition of the organometallic compound.

* * * * *